(12) United States Patent
Sachanandani

(10) Patent No.: US 9,008,654 B2
(45) Date of Patent: Apr. 14, 2015

(54) AUTO IMSI SWITCH FOR INTERNATIONAL ROAMING

(75) Inventor: Vinod Sachanandani, Mumbai (IN)

(73) Assignee: Gemalto SA, Meudon (FR)

( * ) Notice: Subject to any disclaimer, the term of this patent is extended or adjusted under 35 U.S.C. 154(b) by 171 days.

(21) Appl. No.: 13/806,839

(22) PCT Filed: Jun. 25, 2010

(86) PCT No.: PCT/IB2010/001550
§ 371 (c)(1),
(2), (4) Date: Dec. 24, 2012

(87) PCT Pub. No.: WO2011/161490
PCT Pub. Date: Dec. 29, 2011

(65) Prior Publication Data
US 2013/0102306 A1    Apr. 25, 2013

(51) Int. Cl.
| | | |
|---|---|---|
| H04M 3/42 | (2006.01) | |
| H04W 4/00 | (2009.01) | |
| H04W 36/00 | (2009.01) | |
| H04M 3/00 | (2006.01) | |
| H04W 8/06 | (2009.01) | |
| H04L 29/06 | (2006.01) | |
| H04W 8/26 | (2009.01) | |

(Continued)

(52) U.S. Cl.
CPC .............. *H04W 8/06* (2013.01); *H04L 63/0853* (2013.01); *H04W 8/183* (2013.01); *H04W 8/26* (2013.01); *H04W 12/06* (2013.01); *H04W 48/18* (2013.01)

(58) Field of Classification Search
CPC ..... H04W 48/18; H04W 60/04; H04W 8/183; H04W 12/06; H04W 24/04; H04W 36/0016; H04W 36/0033; H04W 8/06; H04W 84/042; H04W 8/18; H04W 8/26; H04W 16/14; H04W 8/245; H04W 12/08; H04W 24/08
USPC ............. 455/418, 422.1, 432.1, 432.2, 432.3, 455/433, 435.1, 435.2, 435.3, 436, 443, 455/558, 18; 379/433.09
See application file for complete search history.

(56) References Cited

U.S. PATENT DOCUMENTS 6,738,622 B1 * 5/2004 Stadelmann et al. ...... 455/435.1
2002/0142753 A1   10/2002 Pecen et al.

(Continued)

FOREIGN PATENT DOCUMENTS

CA         2265560 C       1/2006

OTHER PUBLICATIONS

PCT/IB2010/001550 International Search Report, Mar. 14, 2011, European Patent Office, P.B.5818 Patentlaan 2 NL—2280 HV Rijswijk.

(Continued)

*Primary Examiner* — Inder Mehra
(74) *Attorney, Agent, or Firm* — The Jansson Firm; Pehr B. Jansson

(57) ABSTRACT

The invention concerns a method for automatically switching from a Home IMSI to a Roaming IMSI and vice versa, said Home IMSI and Roaming IMSI being contained in a SIM card adapted to be used in a mobile station and adapted to comprise elementary files, wherein it comprises the step of triggering the switch from one IMSI to another when detecting an update of the elementary file comprising forbidden public land mobile networks ($EF_{FPLMN}$).

14 Claims, 1 Drawing Sheet

(51) Int. Cl.
*H04W 12/06* (2009.01)
*H04W 8/18* (2009.01)
*H04W 48/18* (2009.01)

(56) References Cited

U.S. PATENT DOCUMENTS

2005/0094593 A1* 5/2005 Buckley .................. 370/328
2005/0101323 A1* 5/2005 De Beer ................... 455/435.2
2009/0215447 A1* 8/2009 Catalano et al. .......... 455/432.1

OTHER PUBLICATIONS

PCT/IB2010/001550 Written Opinion of the International Searching Authority, Mar. 14, 2011, European Patent Office, P.B.5818 Patentlaan 2 NL—2280 HV Rijswijk.

* cited by examiner

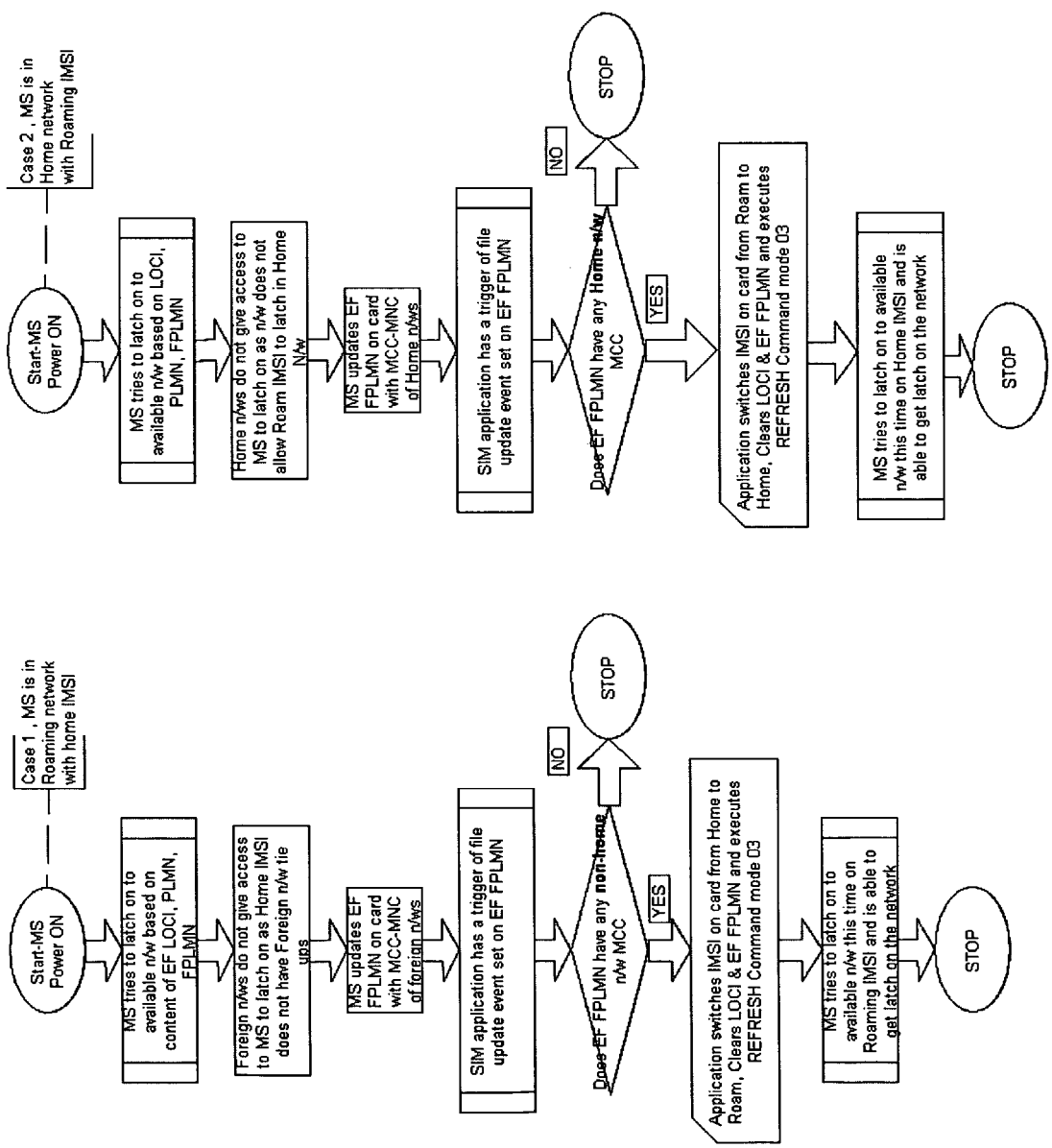

AUTO IMSI SWITCH FOR INTERNATIONAL ROAMING

FIELD OF THE INVENTION

The invention relates to the field of mobile telecommunications, in particular in the field of roaming in mobile networks of mobile subscribers between the home network and foreign networks.

The invention particularly concerns a method for automatically switch from a Home International Mobile Subscriber Identity (Home IMSI) to a Roaming International Mobile Subscriber Identity (Roaming IMSI) and vice versa.

BACKGROUND OF THE INVENTION

Different network operators which provide voice and data services to their own subscribers may also provide such services to subscribers from other networks. These different networks may be available in a same country. When a subscriber leaves his home network and receives service from another network, he is said to be roaming. More precisely, "national roaming" or "home roaming" is where customers roam from their home network to other networks within the same country. This type of roaming is required when the home network does not provide service in all of the nation's territories and/or states). Another case of roaming referred as "international roaming" when the network operator provides services in a foreign country, International roaming involves making or receiving calls or sms . . . from outside the home country's borders.

In order to offer roaming services to their Subscribers when traveling, the Mobile Network Operators (MNO) or Mobile Virtual Network Operators (MVNO) need to put in place Roaming agreements with each operator in each country. Roaming Hubs give access to the MNO or MVNO to their hundreds of roaming agreements and to their infrastructure. A subscriber can then roam to networks with which the operator of the subscriber's home network has a roaming agreement. When a subscriber roams in a foreign network, he may roam onto one of the plurality of communication networks which are available within the relevant geographical area and have a roaming agreement with the home network.

Roaming behavior is for example defined in telecom standards and is controlled for example by data stored on the subscriber identity module (SIM) card, in suitable files present on the SIM such as $EF_{LOCI}$ file, $EF_{PLMNSel}$, $EF_{FPLMN}$, etc.

As well known, the $EF_{LOCI}$ contains the last selected network. More precisely, this file contains information about the mobile network the user is connected to at all times, and contains the Registered Public Land Mobile Network (RPLMN) which is the current roaming network the mobile is registered to. The $EF_{LOCI}$ file comprises the Location Area Information (LAI) which comprises the Mobile Country Code (MCC), the Mobile Network Code (MNC), the Location Area Code (LAC). The MCC identifies the country to which the network the user is connected to belong to. This file may be modified each time the user connects to a different network. The MNC is a code which identifies a network within a country. Then the MNC of the $EF_{LOCI}$ in combination with the MCC, defines the mobile network the user is connected to. The LAC identifies the location area where the subscriber is operative.

The file $EF_{PLMNSel}$ indicates for example the user's preferred network (PLMN) or operator to which the terminal must try to connect to when the user cannot connect to his home network, i.e. when the user starts roaming. If the terminal can not connect to the network indicated in the $EF_{LOCI}$, it then will try to connect to one of the preferred network as indicated in the $EF_{PLMNSel}$, otherwise, it will try to connect to any of the available network.

The $EF_{FPLMN}$ file contains the forbidden list of networks which should not be selected. As per GSM standards, when a handset or a mobile station (MS) tries to latch on to any network, and if the network (MNO) does not provide access, the MS updates the $EF_{FPLMN}$ on SIM Card with specific MCC-MNC of that network. This file is further used by MS to identify those networks which are Forbidden PLMN. The elementary file contains coding for four Forbidden PLMNs (FPLMN). It is read by the handset as part of the SIM initialization procedure and indicates which PLMNs which the MS shall not automatically attempt to access.

The handset modifies its roaming behavior based on the contents of such roaming control files on the SIM card. For doing so, the user needs to be successfully registered with the mobile service of the foreign network, also called here visited network.

Dual IMSI is for example a known SIM-based standalone application which manages two IMSIs for a subscriber in one SIM card: one IMSI for the Home network (MNO) and one IMSI for the international roaming. The home IMSI is used in the subscriber's home country. The Roaming IMSI is used when abroad for connection to a roaming hub. Switching between the two IMSIs is handled automatically by the application, depending on location. The application detects when the end-user is roaming and switches to the Roaming IMSI.

All MNOs which use Dual IMSI application on SIM card, one for Home network and another for Roaming network ensure that while using the Home IMSI, the user does not get service in Roaming or International Network. Similarly, it is also ensured by MNO that while using the Roaming IMSI, the user does not get service in Home network.

As a managed service, this Dual IMSI is extremely simple to implement. The application is deployed over-the-air, so the start up is rapid, and any subsequent changes to country lists are made in the same way.

Nevertheless, currently in many countries, such an automatic application may not be available and if it is available it may be then too expensive for the MNO to deploy. In this case, it may be necessary for the end-user to manually change the IMSI from Home IMSI to Roaming IMSI when roaming in foreign country, and similarly change the IMSI manually from Roam IMSI to Home IMSI when the end-user returns back in his home network. This can be done for example by using a SIM Tool Kit application. Furthermore, as previously described, the switch from the Home IMSI to the Roaming IMSI, and vice versa is only possible if the Home network has established an agreement with the visited network. Operators need to develop new bilateral agreements with selected partners, still using hub-based services for other destinations, which may be costly and long to put in place.

The switch can only be possible if the foreign country has been identified. Thus if the application has some problem to identify the new roaming location, the switch will not occur and the end-user will not be able to use his mobile.

SUMMARY OF THE INVENTION

It is an object of the invention to provide a method for automatically switch from a Home IMSI to a Roaming IMSI and from a Roaming IMSI to the Home IMSI.

Thereto, the present invention provide a method for automatically switch from a Home IMSI to a Roaming IMSI and vice versa, said Home IMSI and Roaming IMSI being contained in a Subscriber Identity Module card (SIM card) adapted to be used in a mobile station and adapted to comprise elementary files, wherein it comprises the step of triggering the switch from one IMSI to another when detecting an update of the elementary file comprising forbidden public land mobile networks ($EF_{FPLMN}$).

According to other aspects of the invention:

the method may comprise switching from the Home IMSI to the Roaming IMSI if the IMSI indicated in the elementary file $EF_{IMSI}$ is the Home IMSI and if the forbidden public land mobile networks file comprises at least one data different from a Mobile Country Code of the home network;

the method may comprise switching from the Roaming IMSI to the Home IMSI if the IMSI indicated in the elementary file $EF^{IMSI}$ is the Roaming IMSI and if the forbidden public land mobile networks file comprises at least one Mobile Country Code of the home network;

it may comprise clearing a file comprising the last registered networks before proceeding to the switch;

it may comprise clearing the file comprising the forbidden public land mobile networks after proceeding to the switch;

it may comprise updating a file which comprises the preferred networks;

it may comprise initializing the SIM card.

Thanks to this method, an auto switch is easily operated by using the EF FPLMN file update for auto-IMSI switch.

The invention also provide a Subscriber Identity Module card adapted to be used in a Mobile Station comprising a Home IMSI and a Roaming IMSI, elementary files, wherein it comprises an application adapted to switch from the Home IMSI to the Roaming IMSI and vice versa according to the method of the invention.

The invention is now described, by way of example, with reference to the accompanying drawings. The specific nature of the following description should not be construed as limiting in any way the broad nature of this summary.

BRIEF DESCRIPTION OF THE DRAWINGS

In order that the manner in which the above recited and other advantages and features of the invention are obtained, a more particular description of the invention briefly described above will be rendered by reference.

Notwithstanding any other forms that may fall within the scope of the present invention, preferred forms of the invention will now be described, by way of example only, with reference to the accompanying drawings in which:

FIG. 1 schematically shows an embodiment of a method according to the invention for a switch from a Home IMSI to a Roaming IMSI;

FIG. 2 schematically shows another embodiment of the method for a switch from the Roaming IMSI to a Home IMSI.

DETAILED DESCRIPTION OF THE PREFERRED EMBODIMENTS

The present invention may be understood according to the detailed description provided herein.

Shown in FIG. 1 is an embodiment of the method according to the invention wherein an end-user uses his mobile station MS in a roaming network with the home IMSI.

The mobile station MS has a SIM card which is able to manage a Home IMSI and an International IMSI, also called Roaming IMSI.

The end-user has for example moved out from India to Singapore.

As previously described, the SIM card of the mobile station MS contains elementary files as specified for example in GSM11.11, such as $EF_{LOCI}$ file, $EF_{PLMNSel}$, $EF_{FPLMN}$ "EF 6F7B", etc, which are used when roaming.

The $EF_{FPLMN}$ file contains a coding for forbidden PLMNs. It is read by the MS as part of the SIM initialization procedure and indicates PLMNs which the MS shall not automatically attempt to access. Thus, this file only contains data on India circles of MNO (which means circles of MNO forbidden in India. A circle can be defined as a region within a country where MNO operates. MNC changes from circle to circle, and MCC remains constant for a country.

The $EF_{LOCI}$ file contains data on the last registered networks of India Circles of MNO.

The SIM card also comprises a specific file or application called "EF App IMSI Status" (AIS) which is able to indicate which IMSI is present in the $EF_{IMSI}$ file "EF 6F07". The data contained in this filed is set to "00" and indicates the used IMSI is the Home IMSI by default.

In this embodiment, the application stores the value of the MCC value.

In a first step, the mobile station is switched on.

Then, the mobile station MS tries to latch on to available networks based on the content of the elementary files $EF_{LOCI}$, $EF_{FPLMN}$ and $EF_{PLMN}$. The foreign networks do not give access to the MS to latch on as the Home IMSI does not have foreign network tie-up. The mobile station tries to search for networks and provides its MCC-MNC to all networks in Singapore The MNOs do not authorize the user to get services as the Home IMSI does not have any tie-ups with any network in Singapore.

Therefore, the MS updates the file $EF_{FPLMN}$ on the SIM card with the MCC-MNC of the foreign networks, which are in this embodiment the MNOs of Singapore, such as "25F5XX25F5XXFFFFFFFFFFFF", wherein XX is the MNC of any Singapore MNO.

A file update event is used by the application so as it detects that the file $EF_{FPLMN}$ has been updated.

The SIM application has a trigger of file update event set on the $EF_{FPLMN}$ file. Once the application receives this event, it checks the MCC content of the $EF_{FPLMN}$ file, and more precisely if the $EF_{FPLMN}$ file comprises any non-home MCC. It checks whether there is any MCC different from the home country MCC. This consists in the given example, to check whether among the MCC present in the $EF_{FPLMN}$ file, there is an MCC besides the India MCC, i.e. besides 404/405.

The visited country MCC are present in the file $EF_{FPLMN}$ and the IMSI present in the $EF_{IMSI}$ is the Home IMSI. The application detects that the user is not in his home country if the MCC value in any of the four pairs of MCC-MNC is different from those related to the home country, and if EF AIS is "00". In the present embodiment it checks whether any MCC in the file $EF_{FPLMN}$ is other than those of India, i.e. other than 404/405 and if EF AIS content is 00.

If it is the case it clears $EF_{LOCI}$ with default content for example "FFFFFFFFFFFFFF0000FF01", switches the IMSI from the Home IMSI to the Roaming IMSI, clears $EF_{FPLMN}$ file with "FF . . . FF". It then updates the $EF_{PLMNSel}$ file if it is required by an operator with the corresponding International PLMN list.

It then updates the EF App IMSI Status (AIS) into "01" and executes the proactive SIM command REFRESH mode 03 (SIM INITIALISATION) which requests the MS to carry out a SIM initialization according to GSM 11.11. This command also makes it possible to restart a card session by initializing the SIM.

As the IMSI is switched from the Home IMSI to the Roaming IMSI, the MS searches for available networks. The MNO in Singapore which now has a tie up with Roaming IMSI Circle, is able to authenticate and provide its services to the subscriber.

In the following specification, the user moved out of the foreign or visited country to his home country as shown in FIG. 2, for example from Singapore to India.

The IMSI used by the user on the SIM card is the Roaming IMSI, the EF App IMSI Status (AIS) containing "01" which indicates that the used IMSI is the Roaming IMSI, as the IMSI present in the $EF_{IMSI}$ file is the Roaming IMSI.

The $EF_{PLMN}$ file comprises only Home Circles of MNO, which correspond to the India Circle of MNO, and the $EF_{LOCI}$ file comprises the last registered networks of visited MNO.

When the handset in powered ON, as per standards the MS tries to search for networks and provide its MCC-MNC to all available network in specific India Circle.

The mobile station MS tries to latch on to available networks based on the content of the elementary files $EF_{LOCI}$, $EF_{FPLMN}$ and $EF_{PLMN}$.

The Home MNO has a setting at network end to not provide service to Roaming IMSI. The available MNOs do not authorize the user to get services. The Home networks do not give access to the MS to latch on as the network does not allow the Roaming IMSI to latch in the Home network.

The MS updates the $EF_{FPLMN}$ file on the SIM card with specific MCC-MNC of the home country networks, which are in our example the MNOs of India. The $EF_{FPLMN}$ is for example updated into "04953004FXXFFFFFFFFFFFFF" where XX is the MNC of any Indian Circle MNO. A file update event is used by the application so as it detects that the file $EF_{FPLMN}$ has been updated.

The SIM application has a trigger of file update event set on the file $EF_{FPLMN}$.

Once the application receives this event, it checks the MCC content of the $EF_{FPLMN}$ file, and more precisely if the $EF_{FPLMN}$ file comprises any home MCC. It checks whether if any MCC is corresponding to one of the home MCC. This consists in the given example, to check whether among the MCC present in the $EF_{FPLMN}$ file, there is an MCC besides the Singapore MCC which is an MCC of India.

The home country MCC are present in the $EF_{FPLMN}$ and the IMSI present in the $EF_{IMSI}$ is the Roaming IMSI. Then if the MCC value in any of the four pairs of MCC-MNC is different from those related to the visited country, i.e. if there is any MCC which is an MCC of the Home country, for example 404/405 for India, and if EF AIS is "01", the application detects that the user is his home country If there is any Home MCC in the $EF_{FPLMN}$ file, it clears the $EF_{LOCI}$ file with default content, switches the IMSI from the Roaming IMSI to the Home IMSI, clears $EF_{FPLMN}$ file with "FF . . . FF". It then updates the $EF_{PLMNSel}$ file if it is required by an operator with the corresponding International PLMN list.

It then updates the EF App IMSI Status (AIS) into "00" and executes the proactive SIM command REFRESH mode 03 (SIM INITIALISATION) which requests the MS to carry out a SIM initialization according to GSM 11.11. This command also makes it possible to restart a card session by resetting the SIM.

As the IMSI is switched from the Roaming IMSI to the Home IMSI, the MS searches for available networks. The MNO in India is able to authenticate and provide its services to the subscriber.

In another embodiment (not represented in the drawings), the user moves from Singapore to another country different from the Home country, for example in China. In this case, the MCC is not updated with India MCC. The application remains dormant and does nothing.

In another embodiment, the value of the Home MCC can for example be stored as a value of home MCC by default in the application buffer.

Thanks to this method, the application allows switching automatically from Home IMSI to International IMSI or vice versa easily, based on a file update event on $EF_{FPLMN}$. When the $EF_{FPLMN}$ file is updated with foreign PLMN the IMSI switch is done automatically from Home to International IMSI. Similarly, when International IMSI is in use, and the $EF_{FPLMN}$ is updated with Domestic PLMN, the IMSI switch is done automatically from International to Home. The $EF_{FPLMN}$ file is cleared when IMSI switch is done.

This method advantageously eradicates the need of current Dual IMSI application to be "VISIBLE" to the end user to manually change IMSI from SIM Tool Kit menu.

This method allows advantageously the switch from the Home IMSI to the Roaming IMSI, and vice versa even if there is no agreement between the Home network and the visited network.

Another advantage is that using this method reduces allows to gain in memory size. The size of this Auto-Switch IMSI application according to the invention is approximately reduced by 30% compared to a typical solution.

The implementation on card side and the service to end user are easier and highly cost effective to the MNO.

When the user goes from Home to any Roam network, the Home MNO does not allow network access to the user for International Network on Home IMSI. Thus, the $EF_{FPLMN}$ on SIM is updated by the handset with the International MCC-MNC. Using the value of the $EF_{FPLMN}$, and according to the MCC values from which it is deducted that the user is in International Network and that the IMSI needs to be changed from Home IMSI to Roaming IMSI. The same procedure is applied when the user comes back to Home Network with a Roaming IMSI.

The invention claimed is:

1. A method for automatically switching from a Home IMSI to a Roaming IMSI and vice versa, said Home IMSI and Roaming IMSI being contained in a SIM card adapted to be used in a mobile station and adapted to comprise elementary files including an elementary file containing a list of forbidden networks which may not be selected, also known as forbidden public land mobile networks file ($EF_{FPLMN}$), wherein the method comprises the step of triggering the switch from a first IMSI of the Home IMSI and Roaming IMSI to the other IMSI of the Home IMSI and the Roaming IMSI when detecting that the forbidden public land mobile networks file ($EF_{FPLMN}$) contains at least one network not corresponding to the first IMSI.

2. The method according to claim 1, wherein the method comprises switching from the Home IMSI to the Roaming IMSI if the IMSI indicated in an elementary file containing a currently used IMSI ($EF_{IMSI}$) is the Home IMSI and if the forbidden public land mobile networks file comprises at least one Mobile Country Code different from a Mobile Country Code of the home network.

3. The method according to claim 1, wherein the method comprises switching from the Roaming IMSI to the Home IMSI if the IMSI indicated in an elementary file containing a currently used IMSI ($EF_{IMSI}$) is the Roaming IMSI and if the forbidden public land mobile networks file comprises at least one Mobile Country Code of the home network.

4. The method according to one of the previous claims, wherein the method comprises clearing an elementary file comprising the last registered networks before proceeding to the switch.

5. The method according to one of claim 1 through 3, wherein the method comprises clearing the file comprising the forbidden public land mobile networks after proceeding to the switch.

6. The method according to claim 5, wherein the method comprises updating a file which comprises the preferred networks.

7. The method according to claim 5, wherein the method comprises initializing the SIM card.

8. A subscriber Identity Module adapted to be used in a Mobile Station comprising a Home IMSI and a Roaming IMSI, elementary files including an elementary file containing a list of forbidden networks which may not be selected, also known as forbidden public land mobile networks file ($EF_{FPLMN}$), comprising an application causing the subscriber identity module to switch from a first IMSI of the Home IMSI and the Roaming IMSI to the other IMSI of the Home IMSI and the Roaming IMSI the subscriber identity module further comprising programming to cause the subscriber identity module to trigger the switch from the first IMSI to the other IMSI when detecting that the forbidden public land mobile network file ($EF_{FPLMN}$) contains at least one network not corresponding to the first IMSI.

9. The subscriber Identity Module of claim 8 further comprising programming to cause the subscriber identity module to switch from the Home IMSI to the Roaming IMSI if the IMSI indicated in the elementary file containing a currently used IMSI ($EF_{IMSI}$) is the Home IMSI and if the forbidden public land mobile networks file comprises at least one Mobile Country Code different from a Mobile Country Code of the home network.

10. The subscriber Identity Module of claim 8 further comprising programming to cause the subscriber identity module to switch from the Roaming IMSI to the Home IMSI if the IMSI indicated in an elementary file containing a currently used IMSI ($EF_{IMSI}$) is the Roaming IMSI and if the forbidden public land mobile networks file comprises at least one Mobile Country Code of the home network.

11. The subscriber Identity Module of claim 8, 9 or 10 further comprising programming to cause the subscriber identity module to clear an elementary file comprising the last registered networks before proceeding to the switch.

12. The subscriber Identity Module of claim 8, 9 or 10 further comprising programming to cause the subscriber identity module to clear the file comprising the forbidden public land mobile networks after proceeding to the switch.

13. The subscriber Identity Module of claim 12 further comprising programming to cause the subscriber identity module to update a file which comprises the preferred networks.

14. The subscriber Identity Module of claim 12 further comprising programming to cause the subscriber identity module to initialize the SIM card.

* * * * *